United States Patent Office 2,889,931
Patented June 9, 1959

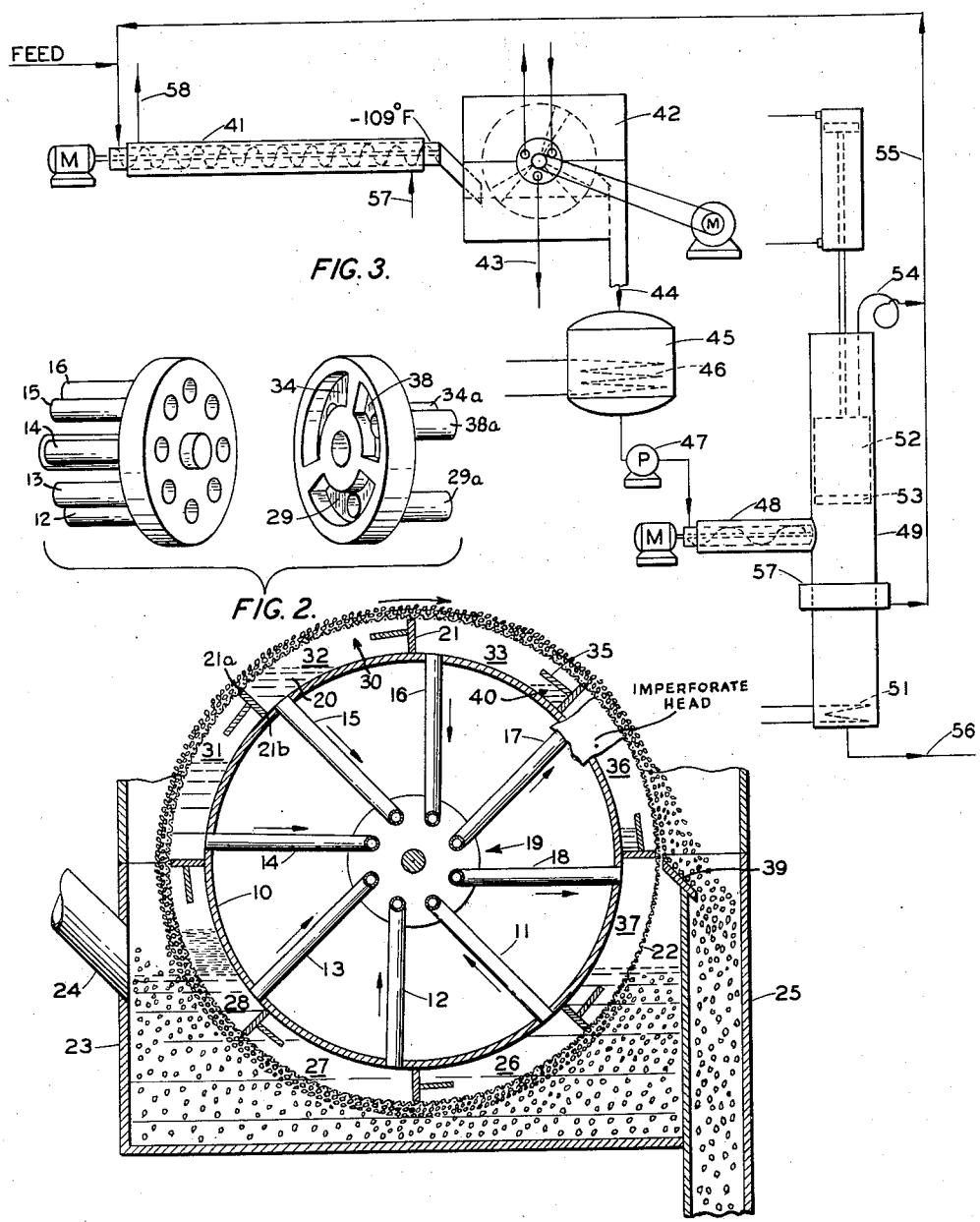

2,889,931

CONTINUOUS ROTARY FILTER

Doyle D. Buttolph, Bartlesville, Okla., assignor to Phillips Petroleum Company, a corporation of Delaware Application December 27, 1954, Serial No. 477,839

3 Claims. (Cl. 210—404)

This invention relates to continuous rotary drum filters. In one of its more specific aspects this invention relates to a modified rotary drum filter which produces a filter cake containing a minimum amount of liquid. In another of its more specific aspects this invention relates to a modification of a rotary drum filter wherein means are provided to prevent liquid from being blown into the filter cake during the discharge cycle. In still another of its more specific aspects this invention relates to a rotary filter drum particularly adapted to the reqiurements of a crystal purification process.

The separation of components of mixtures can be effected by various methods including distillation, solvent extraction and fractional crystallization. Fractional crystallization has one great advantage over other methods of separation in that it is the only separation method which theoretically produces a pure product in a single stage of operation in systems in which the desired component of a mixture solidifies at temperatures above which the other components solidify. Crystallization is thus well suited, not only to the separation of many chemical isomers which can be separated by no other means, but also to the purification of many components which cannot be purified economically by other means. Even though one stage of crystallization theoretically offers a pure product, attainment of this ideal separation has been difficult. Complete removal of occluded impurities without substantial loss in yield is required for attainment of the one stage separation.

There has recently been introduced a system of crystal purification which comprises chilling a liquid containing the material to be separated therefrom so as to produce crystals of at least that material. The resulting slurry of crystals and mother liquor is then filtered and the crystals are warmed so as to produce a slurry of crystals and mother liquor. This slurry is passed to a purification zone where mother liquor is removed and the crystals, in the form of a compact mass, are moved toward a melting zone where the crystals are melted. A portion of the melt is removed as product and the remainder is caused to travel countercurrently through at least a portion of the crystal mass and thereby displaces occluded impurities, which are removed from the system with the mother liquor. This purification system is fully disclosed and claimed in Re. 23,810 issued to J. Schmidt.

It has more recently been determined that the successful operation of this system is, in a large part, dependent upon the efficiency of the above-mentioned filtering step, particularly when the feed contains a low concentration of the desired component.

Rotary filters are most suitable for this system because such filters provide both continuous and efficient filtering operations. However, the rotary filters of the art do not provide the high degree of efficiency required for optimum operation of the purification process because a small amount of liquid is blown back into the filter cake, during the blow cycle, when conventional rotary filters are used. This is because a small amount of liquid is left in the filter segment or piping, even though the filter cake is substantially dried, at the completion of the drying cycle.

If the pipes leading from the filter segments to the slide valve are positioned in the leading edge of the filter segment, the liquid is trapped until the leading edge is lower than the trailing edge and there is not sufficient time for the liquid to be withdrawn from the filter segment and piping before the beginning of the blow or discharge cycle.

If the pipes are connected to the trailing edge of the filter segment, a small amount of liquid is trapped in the leading edge of the filter segment and is blown back into the filter cake even though the piping is free of liquid. If pipes are connected to both the leading edge and trailing edge, the rate of flow of air through each pipe is reduced and there is not sufficient time to remove all of the liquid from the piping.

The amount of liquid blown back into the cake is usually quite small. For example, it has been calculated that for a filter having 12 segments, rotating at 2 r.p.m. and producing 933 lbs./hr. or 0.65 lb./segment of solid paraxylene, the difference in liquid content between 63 and 70 percent para-xylene cake is 0.11 pound per segment. This amount of liquid is equivalent to 58 cc. and represents a layer of liquid across the segment face 0.008 inch thick. It can be seen that this is only about the amount of liquid that is required to wet the surfaces of the filter segment and that it is difficult to remove this residual amount of liquid through the drain lines because of the low velocity of gas passing through the filter segment on the drying cycle. When the flow of gas is reversed, that is on the blow cycle, the velocity of the gas flowing through the filter segment is higher and therefore at least a part of this liquid will be blown back into the cake if means are not provided to prevent it.

It is an object of this invention to provide an improved rotary filter. It is another object to provide means for increasing the solids content of the filter cake discharged from a rotary filter. It is still another object to provide means for preventing liquid from being blown back into the filter cake of a rotary filter during the discharge cycle. Other objects and advantages will be apparent to one skilled in the art upon study of the description of this invention and the appended drawing wherein:

Figure 1 is a sectional elevation of a form of the improved rotary filter,

Figure 2 is a detail view of the slide valve arrangement of the filter, and

Figure 3 is a schematic view of the filter incorporated into a crystal purification system.

Broadly speaking, my invention provides means preventing liquid from being blown from the filter segment of a rotary filter into the filter cake on the discharge cycle by trapping liquid remaining in the filter segment at the completion of the drying cycle. I have provided baffle members attached to the trailing side of the filter segment divider or partition member, with respect to the direction of rotation of the drum, or to the drum and projecting into the filter segment. These baffle members trap the small amount of liquid, remaining in the leading edge of the filter segment at the completion of the drying cycle, and hold the liquid against the filter drum and away from the filter surface and filter cake. This liquid cannot be blown into the filter cake. The baffle members can be perpendicular to the divider member or can be inclined toward the filter surface, or can be inclined toward the drum surface.

Referrring now to the drawing and particularly to Figure 1, filter drum 10 has conduit lines 11, 12, 13, 14, 15, 16, 17, and 18 communicating with the exterior surface of the drum and slide valve 19 shown in detail in Figure 2. Partition members 21 are positioned around the outside surface of drum 10 so as to provide support for the filter medium such as screen 22 and to divide the chamber between drum 10 and screen 22 into segments. The imperforate heads of the filter drum form two sides of the chamber between the drum and the filter screen. Conduits 11 to 18 connect the trailing edge of each segment with slide valve 19. Drum 10 is partially immersed in vessel 23 containing the slurry of solids and liquid to be separated. Slurry is supplied to vessel 23 by conduit 24 and solids removed from the liquid are removed by means of conduit 25.

Each partition member 21 has one edge 21a attached to screen 22 and the other edge 21b attached to drum 10. The partition members 21 form the segments indicated as 26, 27, 28, 31, 32, 33, 36, and 37, each has a leading edge or portion indicated at 30 and a trailing edge or portion indicated at 20. Each baffle 35 is secured to the trailing side of the partition member 21, with respect to the direction of rotation of drum 10, so as to project into the trailing portion 30 of the filter segments 26, 27, 28, 31, 32, 33, 36, and 37. The filter segments are all identical but are numbered differently to facilitate describing the function of each one at the various stages of the filtering cycle.

As the drum rotates vacuum is applied to that portion of the drum and screen which is below the surface of the slurry, indicated in Figure 1, by the segments connected to the slide valve by conduits 11, 12 and 13. Thus segments 26, 27 and 28 become filled or substantially filled with liquid and solids are collected upon the outer surface of screen 22. These segments are connected to port 29 of slide valve 19 and conduit 29a for suction, shown in Figure 2, by conduits 11, 12 and 13.

As the drum continues to rotate, segments shown in the position indicated in Figure 1 by 26, 27 and 28, are moved so as to occupy a position so as to be connected to the slide valve 19 by conduits in the position indicated by 14, 15, and 16. Vacuum is applied to segments indicated by 31, 32 and 33 so as to draw air or other drying medium through the filter cake of solids collected upon screen 22 and to withdraw liquid from segments 31, 32 and 33. These segments are connected to port 34 of slide valve 19 and conduit 34a for suction, as shown in Figure 2, by conduits 14, 15 and 16.

When a segment of the filter is in the position indicated by 33, a small amount of liquid remains and advances to the leading edge of the segment. This liquid is trapped in the pocket 40 formed between baffle 35 and drum 10.

As the drum continues to rotate, the segments shown in positions 32 and 33 advance so as to occupy positions indicated by 36 and 37 and are connected to port 38 in slide valve 19 and conduit 38a for pressure gas by conduits 17 and 18. The flow through port 38 is the reverse of that through ports 29 and 34. Air or other gas is normally supplied through port 38 and the flow rate is considerably higher than that through ports 29 and 34 so as to loosen the filter cake from screen 22. Baffle 35 prevents the liquid, remaining in the segment, from being blown onto the filter cake.

Knife edge 39 removes the filter cake of dry solids which is removed by means of conduit 25.

Referring now to Figure 3, a slurry of liquid and solids, for example crystals of a mixture of isomeric, 8 carbon atom hydrocarbons and mother liquor, is formed in scraped chiller 41 and supplied to the rotary filter 42. Mother liquor is removed through line 43 and crystals are removed through line 44 to vessel 45 and heated by heater 46 so as to produce a slurry of crystals and mother liquor. This resulting slurry is introduced by means of pump 47 and scraped chiller 48 to crystal purification column 49. In column 49 the crystals are compacted and moved toward heater 51 by means of piston 52 which has perforate face 53 so that mother liquor is removed from the slurry and passed by means of line 54 to recycle line 55. The crystal mass is melted by heater 51 and a portion of the melt is removed by line 56 as product. The remainder of the melt travels countercurrently to the flow of the mass of crystals and displaces accluded mother liquor which is removed by perforate section 57 to recycle line 55. The recycled mother liquor is returned to chiller 41. Chiller 41 is refrigerated by refrigerant supplied through line 57 and withdrawn through line 58.

Better understanding of the invention will be obtained by reference to the following examples which are intended to illustrate, but should not be construed to limit the invention.

*Example I*

In a process for separating para-xylene from a mixed xylene stream containing approximately 16 weight percent para-xylene, a 3 foot (diameter) by 1 foot rotary filter having drain lines in the leading edge of the filter segments was used and provided excess filtering capacity for one 8 inch purification column used in connection with the filter. The filter cake discharged from the filter averaged about 58 weight percent para-xylene and droplets of liquid were blown off the cake on the blow or discharge cycle. The filter segment dividers were not equipped with the liquid retaining baffles of my invention.

The 3 foot (diameter) by 1 foot filter was replaced by a 3 foot (diameter) by 4 foot rotary filter having drain lines in the trailing edge of the filter segments and the filter segment dividers were provided with the liquid retaining baffles of my invention. This filter provided excess filtering capacity for two 8 inch purification columns used therewith. The filter cake discharged from this filter averaged about 63 weight percent para-xylene.

Although the increase in para-xylene content of the feed to the purification columns was about 5 percent, the overall increase in para-xylene produced by the purification columns was from 25 to 35 percent more with the 63 percent para-xylene feed than with the 58 percent para-xylene feed. This greatly increased production is due to the fact that purification column production vs. purity of purification column feed is not a straight line function. As the feed purity increases the rate of production of product of a given purity increases by more than direct proportion.

In order to more clearly demonstrate the advantages obtained by my invention, the following examples have been calculated from actual operating data.

*Example II*

In a process employing a rotary filter without the baffles of my invention, 635 lbs./hr. of a mixed xylene stream containing about 16 weight percent para-xylene are fed to a scraped surface chiller. A slurry containing about 14 percent solids emerges from the chiller at −109° F. and is fed to the rotary filter rotating at 2 r.p.m. where 120 lbs./hr. of filter cake containing about 58 weight percent para-xylene are recovered. The cake is then heated to melt substantially all the solids and the melt is then cooled to about −20° F. to produce a slurry containing about 40 weight percent solids. The slurry is then fed to a crystal purification column where about 65 lbs./hr. of 98 weight percent para-xylene are recovered.

*Example III*

In a process employing the filter of Example II equipped with liquid retaining baffles of my invention, 857 lbs./hr. of a mixed xylene stream containing about 16 weight percent para-xylene are fed to a scraped surface chiller. A slurry containing about 14 weight percent solids emerges from the chiller at −109° F. and is fed to the rotary filter rotating at 2 r.p.m. where 216 lbs./hr. of filter cake containing about 63 weight percent para-xylene are recovered. The cake is then heated to melt substantially all the solids and the melt is then cooled to about −8° F. to produce a slurry containing about 40 weight percent solids. The slurry is then fed to the purification column of Example II where about 88 lbs./hr. of 98 weight percent of para-xylene are recovered.

From the above examples it can be seen that installation of the liquid retaining baffles of my invention in the rotary filter increases the product rate of a crystal purification column about 35 percent.

The product purity is maintained substantially constant and a small increase in feed purity permits a large increase in feed rate and, therefore, product rate at constant product purity. Furthermore, the increase in para-xylene content of the filter cake makes it possible to obtain a slurry of the desired solids content at a higher temperature so that a saving in refrigeration cost is realized. Therefore, it can be seen that my invention, not only increases the production of the crystal purification system, but also increases the overall efficiency of the system.

Variations and modifications are possible within the scope of the disclosure of the present invention, the essence of which is the provision of a liquid retaining baffle attached to the segment dividers of a rotary filter so as to prevent trapped liquid from being blown into the filter cake during the blow cycle of the filter.

That which is claimed is:

1. In a rotary filter comprising imperforate heads spaced apart by a filter medium spaced externally from an impervious drum, spaced partition members connecting said drum and said filter medium so as to form separate filter segments, drain conduits connected to the trailing edge of said filter segments, means for alternately supplying fluid to and withdrawing fluid from said drain conduits and means to rotate said drum, the improvement which comprises baffle means positioned adjacent the trailing side of said partition members and spaced from said filter medium and said drum so as to form pockets between said baffles and said drum.

2. A rotary filter comprising imperforate heads spaced apart by an imperforate drum of smaller diameter than said heads; a perforate filter medium attached to said heads so as to form a filter chamber between said drum and said filter medium; a vessel adapted to contain material to be filtered and adapted to support said drum so that a portion of the drum is submerged in said material; means adapted to rotate said drum; partition members connected to said drum and said filter medium so as to divide said filter chamber into segments; a baffle member secured to the trailing side of each of said partition members, with respect to the direction of rotation, and projecting into said filter segment intermediate and spaced from said filter medium and said drum so as to form a pocket between said baffle and said drum; a slide valve containing a plurality of ports; conduits connecting the trailing edge of said filter segments with said slide valve; means for applying a vacuum to at least one of said filter segments through said slide valve; means for supplying pressure to at least one of said filter segments; and means for removing solid material from the surface of said filter medium.

3. An improved filter for separating and recovering substantially dry crystals from a slurry of mother liquor and crystals comprising imperforate heads spaced apart by a filter medium spaced externally from an imperforate drum; spaced partition members connecting said drum and said filter medium so as to form separate filter segments; means to rotate said drum; means to contain said slurry so that a portion of said drum and said filter medium is beneath the surface of said slurry; conduit means connected to the trailing portion of said filter segments; means for applying vacuum to those conduits connected to those filter segments submerged in said slurry and those having crystals thereon which are being dried; means for supplying a flow of gas under pressure to those conduits connected to filter segments having dried crystals thereon; liquid-retaining baffle means attached to the trailing side of said partition members intermediate and spaced from said filter medium and said drum to prevent liquid being blown onto the crystals by the gas flow; and means for removing dried crystals from the filter medium.

References Cited in the file of this patent

UNITED STATES PATENTS

| Re. 23,810 | Schmidt | Mar. 30, 1954 |
| 2,321,230 | Mills et al. | June 8, 1943 |
| 2,395,098 | Butler | Feb. 19, 1946 |
| 2,534,161 | Collins | Dec. 12, 1950 |

FOREIGN PATENTS

| 642,643 | Germany | Mar. 15, 1937 |
| 658,649 | Germany | Apr. 7, 1938 |